June 23, 1925.
J. B. WARD
1,543,136
DOUGH CUTTING MACHINE
Filed July 16, 1923 2 Sheets-Sheet 1
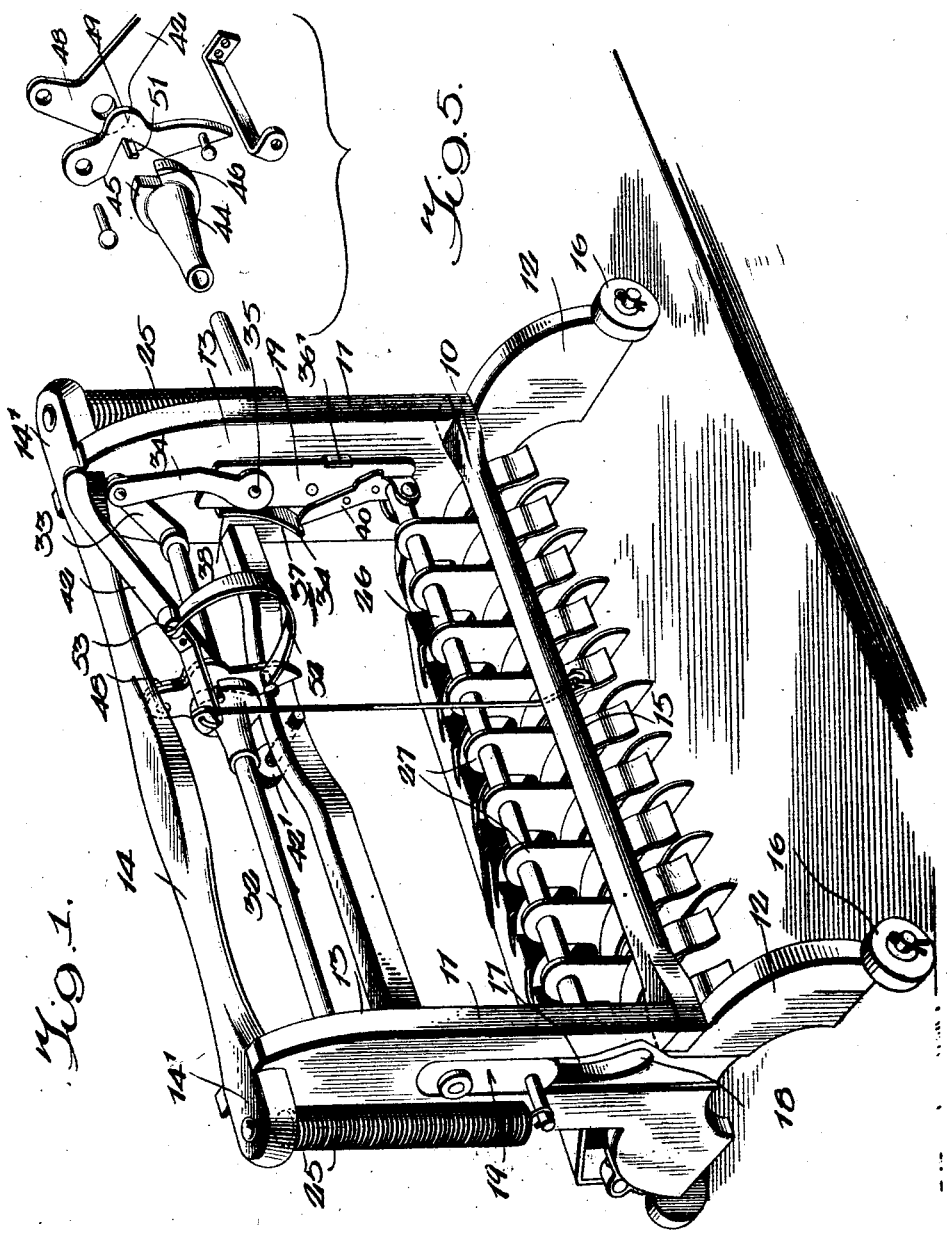
WITNESS
INVENTOR
J. B. WARD,
BY
ATTORNEYS June 23, 1925.  
J. B. WARD  
DOUGH CUTTING MACHINE  
Filed July 16, 1923  
1,543,136  
2 Sheets-Sheet 2
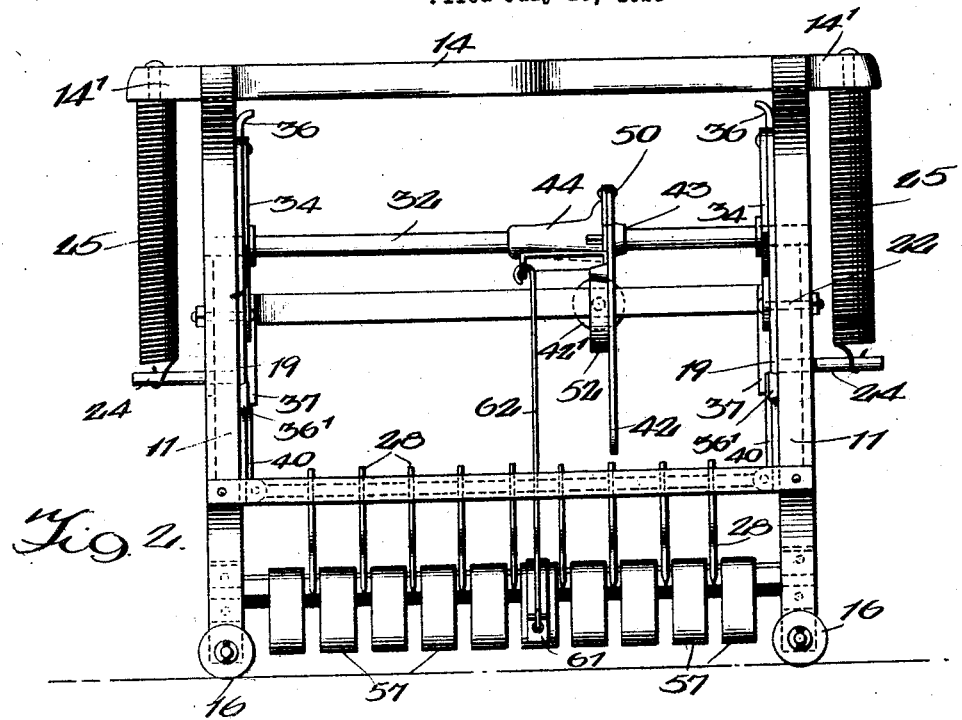
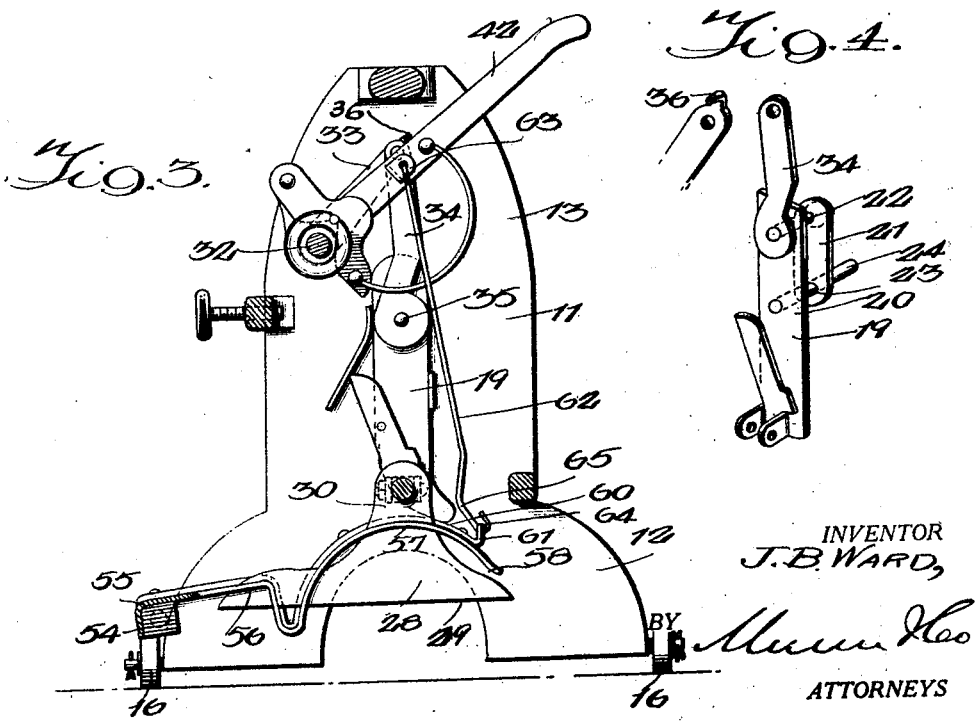
INVENTOR  
J. B. WARD,  
BY  
ATTORNEYS Patented June 23, 1925.

1,543,136

UNITED STATES PATENT OFFICE.

JAMES BENJAMAN WARD, OF NASHVILLE, TENNESSEE.

DOUGH-CUTTING MACHINE.

Application filed July 16, 1923. Serial No. 651,886.

*To all whom it may concern:*

Be it known that I, JAMES B. WARD, a citizen of the United States, residing at Nashville, in the county of Davidson, State of Tennessee, have invented certain new and useful Improvements in Dough-Cutting Machines, of which the following is a specification.

This invention relates to dough cutting machine.

In bakeries where small cakes and rolls are made it is necessary to cut the dough in either instance previous to the baking thereof. The dough is usually cut into pieces of the same length and thereby to produce uniform cakes or rolls. This operation is usually performed by hand and entails considerable time.

The object of the present invention is to provide a machine whereby a strip or length of dough may be cut into a plurality of uniform pieces in an efficient and quick manner.

It is also an important object of the invention that the pieces of dough cut by the machine will be entirely severed from each other and thereby facilitate the handling of the same.

It is also within the scope of the objects of the invention that the device be portable and easy to operate.

Other objects, and objects relating to details of construction, combination and arrangement of parts will hereinafter appear in the detailed description to follow.

The invention is illustrated by way of example in the accompanying drawings, in which:—

Figure 1 is a perspective view of the device and showing the same when ready to be operated for cutting dough, Figure 2 is a view in side elevation of the same and showing the cutter blades raised and the dough retaining fingers in their lowered or applied position, Figure 3 is a vertical sectional view of the device and showing the dough cutters and dough retaining fingers in the position shown in Figure 1, Figure 4 is a group view showing the elements for the releasing mechanism of the cutter blades, Figure 5 is a detail perspective view of one of the reciprocating frames employed for the cutter supporting shaft.

Referring to the drawings 10, indicates generally a frame which may comprise the two upright members 11, each constituting a bottom and enlarged portion 12 and an upper portion 13. Between the upper ends of the uprights 11 there is extended a bar 14 which preferably has its edges rounded in order to form a handle for the device, whereby the same may be lifted. Also each end of the bar 14 is extended from the associated member 11, as at 14', for a purpose which will later appear. Also between the forward edges of the members 11 there is extended a bar 15, whereby to reinforce and strengthen the same. Each member 11 carries a pair of wheels 16, said wheels being positioned as shown and suitably journaled.

Each member 11 is provided with a vertically extending and elongated slot 17, and each slot terminating at its lower end in an offset portion 18. A reciprocating frame 19 is provided for each of the members 11, said frame comprising in each instance an inner plate member 20 and an outer plate member 21. Each plate member 20 is secured to its associated plate member 21 by the means of a bolt 22 and a pin 23. The bolt and pin are disposed to operate within the slot 17 of the associated member 11 and the pin 23 in each instance is extended from the outer side of the associated member 11, as at 24. Between each pin extension 24 and the associated extended portion 14' of the bar 14 there is secured a retractile spring 25 and thereby to yieldingly hold the frames 19 against downward movement.

Between the frames 19 there is supported a bar 26, said bar being preferably removably supported between the frames 19, as shown, and said bar carrying a plurality of cutter blades or knives 27. Each cutter blade or knife 27 comprises an elongated bottom portion 28 which is suitably beveled upon its lower edge to provide a cutting edge, as shown at 29, and also each cutter blade includes an upwardly extending and reduced portion 30 which is provided with an opening adapted to receive the bar 26.

Between the members 11 of the frame 10 there is rotatably supported a shaft, generally indicated by the reference character 32, said shaft having rigidly extending from each end thereof, an arm 33 and each arm having pivotally connected at its outer end the one end of a link member 34. Each link member 34 has its lower end pivotally connected to the inner plate member 20 of the associated frame 19, as at 35. Also each arm 33 has its upper end formed with a tang or extension 36 adapted to engage the bottom side of the frame member 14 and serve as a bumper against upward movement of the frames 19. Each frame 11 carries upon its inner side a tang or extension 36' and this extension is adapted to engage with the one edge of the associated plate member 20. Also each member 11 carries a laterally extending guide member 37, the upper end portion 38 of which is adapted to engage in each instance with one edge of the associated plate 20, while the lower portion 39 thereof is disposed at an angle to the upper portion and adapted to be engaged by a finger 40 carried by the associated frame 19 and thus to further limit the upward movement of the frames 19.

The shaft 32 has pivotally connected thereto the one end of a hand lever 42. The hand lever is held against longitudinal movement in one direction by a suitable collar 43, said collar being secured to the shaft 32. The hand lever 42 is held against movement upon the shaft 32 in the opposite direction by a sleeve 44, said sleeve being provided at its one end with an annular enlargement 45 which is formed with a notch 46. The pivoted end of the hand lever 42 is provided with a lateral extension 48, and the free end of this extension has pivotally connected thereto the one end of a latch member 49, as at 50. This latch member carries a pin 51 which is adapted to engage in the notch 46 of the sleeve enlargement 45. To the free end of the latch member 49 there is secured the one end of a bow spring 52, the other end of said bow spring 52 being secured to the hand lever 42, as at 53. An adjustable screw 42' is provided for the latch member 49.

Between the lower end portions 12 of the frame members 11 there is rotatably supported a shaft 54, which is preferably square in cross section, as shown and upon which there is secured an elongated plate member 55, said plate member being preferably L-shaped, as shown, in order that the same may be secured to the shaft 54 and said plate member being formed with a plurality of dough-retaining fingers 56. Each finger 56 terminates at its outer end in an arcuate-shaped portion 57, and the terminal of each arcuate portion 57 is slightly turned upwardly, as at 58. The number of fingers 57 exceed by one the number of cutter blades 27, and the fingers 56 are so arranged that each cutter blade 27 operates between a pair of fingers. Upon the central finger 56 there is secured a strip 60 which has its forward end provided with an eye 61. A link 62 is provided and the upper end thereof is secured to the hand lever 42, as at 63, while the lower end of this link is provided with a hook 64 and previous to this hook the link is formed with an offset portion 65.

In the use of the present device the same may be placed upon a strip of dough and as illustrated in Figure 1 and the hand lever elevated, and thus to raise the dough-retaining fingers 56 and also the dough cutters or knives 27. Upon pressing downward upon the hand lever 42 the pin 51 will cause rotation of the shaft 32 and thus to move downwardly the frames 19 together with the bar 26 and knives 27 carried thereby. Further downward movement of the hand lever 42 will cause the knives 27 to sever the dough. Also during this interval the rod 62 has permitted the retaining fingers 56 to drop upon the dough and thus to hold the same in position while being severed. It is important to note that with the offset portion 65 of the rod 62 no pressure upon the retaining fingers will be exerted with the downward movement of the lever 42. The frame members 19 will move downward until the pins 23 engage in the offset slot portions 18 and then there will occur a forward movement of the bar 26. At this moment the knives 27 will be partially through the dough and the forward movement thereof will cause a clean cutting of the dough with the result that the pieces of dough made by this operation will be separated from each other.

With further downward movement of the hand lever 42, the free end of the latch member 49 will be stopped by the set screw 42' while the other end of the latch member being pivoted to extension 48 of the lever 42, will continue to move until pin 51 is removed from notch 46 and thus release the shaft 32 from the hand lever 42 and latch 49. With this occurring the springs 25 will operate to quickly withdraw the cutter blades 27 from the dough and elevate the same as illustrated in Figure 2 of the drawings. The dough retaining fingers 56 will still remain upon the dough and thus aid in facilitating the removal of the cutter blades 27 from the dough. The operator may now raise the handle 42 until the pin 51 of the latch member 49 engages in the notch 46 and thus further elevate the cutter blades or knives 27. Also with the raising of the handle lever 42 the link member 62' will draw upwardly the dough-retaining fingers 56 and now the pieces of dough provided by the operation described may be removed and the device is ready for another operation.

While I have shown and described the preferred form of my invention, I wish it to be understood that I am aware of the fact that the construction, combination and arrangement of parts may be changed by

I claim:

1. In a device of the character described, a bar disposed horizontally, a plurality of blades carried by said bar, means whereby said bar may have vertical movement, means for yieldably retaining the bar in an elevated position with respect to its vertical movement, a shaft rotatably supported, a hand lever for rotating said shaft, connecting means between said hand lever and the bar carrying said blade whereby said bar may be moved downwardly with the rotation of said shaft in a predetermined direction, means whereby the bar carrying said blade will be moved laterally previous to the moment said bar assumes its lowermost position with respect to its vertical movement, and means whereby the bar carrying said blades will be automatically released upon the completion of its lateral movement and permitted to assume its elevated position with respect to its vertical movement.

2. A dough cutting machine comprising a vertically reciprocable blade carrying frame, means for normally and yieldably holding the frame in an elevated position, a shaft, link connections between the shaft and blade carrying frame whereby the frame can be forced downward with the rotation of shaft, a handle extending from the shaft for manually rotating the same, and means whereby the handle will be automatically released from the shaft at the termination of the downward stroke of the blade carrying frame.

3. A dough cutting machine comprising a vertically reciprocable blade carrying frame, means for normally and yieldably holding the frame in an elevated position, a shaft, link connections between the shaft and blade carrying frame whereby the frame can be forced downward with the rotation of shaft, a handle extending from the shaft for manually rotating the same, a second rotatable shaft, a plurality of dough retaining fingers extending from the second shaft, and connecting means between the handle and dough retaining fingers for elevating the free ends of the fingers during the period the handle is raised.

4. A dough cutting machine comprising a vertically reciprocable blade carrying frame, means for normally and yieldably holding the frame in an elevated position, a shaft, link connections between the shaft and blade carrying frame whereby the frame can be forced downward with the rotation of shaft, a handle extending from the shaft for manually rotating the same, a second rotatable shaft, a plurality of dough retaining fingers extending from the second shaft, connecting means between the handle and dough-retaining fingers for elevating the free ends of the fingers when said handle is swung upward, means whereby with the downward movement of the handle the same will be automatically released from the shaft upon the blade carrying frame terminating its downward stroke, and the connecting means between the handle and retaining fingers serving to hold said retaining fingers depressed while the blade carrying frame moves upward and assumes its normal position.

JAMES BENJAMAN WARD.